(12) United States Patent
Jiang et al.

(10) Patent No.: US 9,548,791 B2
(45) Date of Patent: Jan. 17, 2017

(54) REMOTE OPERATION AND CONTROL SYSTEM FOR PRESSURE FILTER

(71) Applicant: Shandong Jingjin Environmental Protection Equipment Co., Ltd., Shandong (CN)

(72) Inventors: Guiting Jiang, Shandong (CN); Fengqi Yan, Shandong (CN)

(73) Assignee: JINGJIN ENVIRONMENTAL PROTECTION INC., Shandong (CN)

( * ) Notice: Subject to any disclaimer, the term of this patent is extended or adjusted under 35 U.S.C. 154(b) by 146 days.

(21) Appl. No.: 14/352,939

(22) PCT Filed: May 29, 2013

(86) PCT No.: PCT/CN2013/076378
§ 371 (c)(1),
(2) Date: Jun. 23, 2014

(87) PCT Pub. No.: WO2013/178062
PCT Pub. Date: Dec. 5, 2013

(65) Prior Publication Data
US 2014/0320275 A1    Oct. 30, 2014

(30) Foreign Application Priority Data

May 31, 2012 (CN) .......................... 2012 1 0175313

(51) Int. Cl.
*H04B 3/02* (2006.01)
*H04L 29/08* (2006.01)
(Continued)

(52) U.S. Cl.
CPC ................. *H04B 3/02* (2013.01); *H04L 12/28* (2013.01); *H04L 67/125* (2013.01); *H04W 4/005* (2013.01)

(58) Field of Classification Search
CPC ........ G05B 19/418; H04L 12/28; H04L 29/06; H04L 67/125; H04W 4/005; H04B 3/02
(Continued)

(56) References Cited

U.S. PATENT DOCUMENTS 4,793,836 A * 12/1988 Griffis .................... B01D 46/42
                                                                      55/385.2
6,519,938 B1    2/2003 Foss
(Continued)

FOREIGN PATENT DOCUMENTS

CN        201052430 Y       4/2008
CN        201098584 Y       8/2008
(Continued)

OTHER PUBLICATIONS

Chunguo et al (2011) The Tenth International Conference on Electronic Measurement & Instruments ICEMI 2011: 222-226 "Development of an OPC Server for Remote Monitoring and Control Based on GPRS Networks".
(Continued)

*Primary Examiner* — Brian Miller
(74) *Attorney, Agent, or Firm* — Swanson & Bratschun, L.L.C.

(57) ABSTRACT

A remote operation and control system for a pressure filter; a PLC controller in a pressure filter body is connected to the interface of a GPRS-DTU communication network; the aerial of the GPRS-DTU communication network is linked to a communication tower via a signal; the communication tower is connected to a GGSN communication interface and an SGSN communication interface, forming a GPRS communication network; the GPRS communication network is connected to the wiring port of a router; a wire connects to a firewall via the router, and enters the wiring port of a switch; an industrial Ethernet is configured to connect to the
(Continued)

wiring port of the switch. The remote operation and control system for a pressure filter achieves unattended operation on the working site of the pressure filter, thus improving the technical level of the control system.

6 Claims, 1 Drawing Sheet

(51) Int. Cl.
    *H04L 12/28*     (2006.01)
    *H04W 4/00*     (2009.01)

(58) Field of Classification Search
    USPC ........................................................ 340/12.32
    See application file for complete search history.

(56) References Cited

U.S. PATENT DOCUMENTS

| | | | | |
|---|---|---|---|---|
| 6,940,869 | B1* | 9/2005 | Wang | H04L 29/12009 |
| | | | | 370/466 |
| 7,027,808 | B2* | 4/2006 | Wesby | G06Q 40/00 |
| | | | | 340/853.1 |
| 7,260,618 | B2* | 8/2007 | Ahonen | G07F 5/18 |
| | | | | 707/999.202 |
| 7,444,401 | B1* | 10/2008 | Keyghobad | H04L 12/2818 |
| | | | | 455/41.2 |
| 7,852,239 | B2* | 12/2010 | Kong | G10L 19/18 |
| | | | | 341/61 |
| 7,895,290 | B2* | 2/2011 | Aureli | H04L 29/08846 |
| | | | | 709/217 |
| 8,926,739 | B2* | 1/2015 | Morgan | B01D 53/30 |
| | | | | 96/111 |
| 9,041,548 | B2* | 5/2015 | Portocalis | B64F 1/28 |
| | | | | 340/870.02 |
| 2005/0021839 | A1 | 1/2005 | Russell et al. | |
| 2006/0057020 | A1* | 3/2006 | Tufo | A61L 9/20 |
| | | | | 422/24 |
| 2006/0126647 | A1 | 6/2006 | Hicks, III | |
| 2011/0200052 | A1* | 8/2011 | Mungo | H04L 41/028 |
| | | | | 370/401 |
| 2013/0286820 | A1* | 10/2013 | Angst | H04L 47/32 |
| | | | | 370/225 |

FOREIGN PATENT DOCUMENTS

| | | |
|---|---|---|
| CN | 101498468 A | 5/2009 |
| CN | 101608823 A | 12/2009 |
| CN | 201812194 U | 4/2011 |
| CN | 201978556 U | 9/2011 |
| CN | 202049587 U | 11/2011 |
| CN | 102469129 A | 5/2012 |
| CN | 102692903 A | 9/2012 |
| JP | 2005222133 A | 8/2005 |

OTHER PUBLICATIONS

European Search Report from EP 13796246.0 dated Mar. 17, 2015.
International Search Report dated Jul. 30, 2013, from PCT/CN2013/076378.

\* cited by examiner

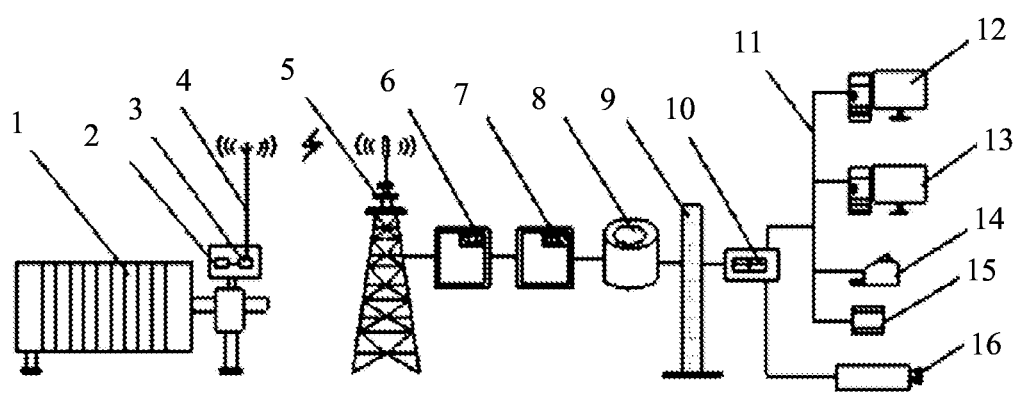

REMOTE OPERATION AND CONTROL SYSTEM FOR PRESSURE FILTER

This application is a 35 U.S.C. §371 national phase application of PCT/CN2013/076378 (WO/2013/178062), filed on May 29, 2013, entitled "Remote Operation and Control System for Pressure Filter", which application claims priority to Chinese Patent Application No. 201210175313.1, filed on May 31, 2012, each of which is incorporated herein by reference in its entirety.

TECHNICAL FIELD

The present disclosure relates to a control system for a pressure filter, and in particular, to a remote operation and control system for a pressure filter.

BACKGROUND

A pressure filter is a device mainly for solid-liquid separation. A control system is a component of the pressure filter for filtering. The filtering procedure of the pressure filter is performed by a Programmable Logic Controller (PLC) control system completely. The PLC control system is installed on the pressure filter and is operated by an operator. However, the pressure filter is operated in humid environment and materials to be filtered may contain a caustic chemical gas, hence the operator at the scene is in danger and may get injured. In addition, the labor cost and the production cost for operating the pressure filter at the scene are high, and the control system for the pressure filter is not advanced, which are the disadvantages for the existing operation and control system for the pressure filter.

SUMMARY

In view of the above disadvantages in the prior art, a remote operation and control system for a pressure filter is provided according to technical solutions of the disclosure, by which the pressure filter can operate with no operator at the scene, and accordingly, the technological capability of the control system is improved.

A remote operation and control system for the pressure filter is provided in a technical solution of the disclosure. A general packet radio service-data transfer unit (GPRS-DTU) communication network is provided in the pressure filter. A PLC controller in the pressure filter is connected to the GPRS-DTU communication network. A signal antenna is provided for the GPRS-DTU communication network and the antenna communicates with a communication tower. A gateway GPRS support node (GGSN) communication interface and a serving GPRS support node (SGSN) communication interface form a GPRS communication network, and a signal from the communication tower is transmitted to the GPRS communication network. A router is connected to the GPRS communication network, and the signal is transmitted from a connection port of the GPRS communication network to the router. The router is connected to a firewall and the firewall is connected to a switch, and the signal is transmitted to the firewall via the router and then to the switch. An industrial Ethernet is connected to the switch. A Computer in the industrial Ethernet is connected to the switch and a PLC control system. A fiber transceiver is connected to the switch and the PLC control system.

The computer in the industrial Ethernet includes a workstation for an operator of the pressure filter.

The computer in the industrial Ethernet includes a workstation for an engineer of the pressure filter.

The industrial Ethernet includes an uninterruptible power system (UPS) power supply.

The industrial Ethernet includes a printer.

The fiber transceiver is connected to the switch to form a Local Area Network for a company.

The remote operation and control system for the pressure filter is provided in the disclosure. A GPRS-DTU communication network is provided in the pressure filter. A PLC system in the pressure filter is connected to the GPRS-DTU communication network. A signal antenna is provided for the GPRS-DTU communication network and the antenna communicates with the communication tower. A GGSN and an SGSN form a GPRS communication network, and the signal from the communication tower is transmitted to the GPRS communication network. A router is connected to the GPRS communication network, and the signal is transmitted from a connection port of the GPRS communication network to the router. The router is connected to the firewall and the firewall is connected to the switch, and the signal is transmitted to the firewall via the router and then to the switch. An industrial Ethernet is connected to the switch. A computer in the industrial Ethernet is connected to the switch and the PLC control system. A fiber transceiver is connected to the switch and the PLC control system.

In an embodiment of the disclosure, the pressure filter is operated and controlled by a remote computer to perform filtration, and data communication among respective remote PLC control systems of the pressure filter is achieved through the GPRS communication network of China Mobile. GPRS-DTU is a main device for the GPRS communication network and is an interface to the GPRS communication network of China Mobile. An approach of GPRS Access Point Name (APN) is applied for the GPRS communication network of China Mobile. China Mobile net (CMNET) is based on a public network of China Mobile, while dedicated access is chosen herein. The GPRS communication network of China Mobile has a channel interface to the Internet, therefore, after data of the destination of sent data, i.e., the IP address or the domain name of the data center server or the router, and interface parameters such as Baud rate, stop bit, odd-even check, data bit and flow control of PLC recommended standard (RS) 232 are sent to a combined GPRS support node (CGSN) server in the GPRS communication network of China Mobile through GPRS DTU, the CGSN server may forward the data to the data center server or the router through the Internet. Virtual private network (VPN) is applied to ensure security of data transmission between the GPRS communication network of China Mobile and the data center or the router. With the VPN, a generic routing encapsulation (GRE) tunnel of the VPN is established between the data center or the router and an exit gateway server of China Mobile to ensure the security of data transmission between the two points and protect the data from being stolen or tampered by others. GPRS is a mobile data communication service, which provides a connection between a mobile user and a data network and provides the mobile user with a high-speed wireless internet protocol (IP). Packet switching is applied in GPRS, and each user may simultaneously use a plurality of wireless channels and one wireless channel may be shared by a plurality of users. Hence the resource is effectively used, data transmission rate is up to 160 Kbps, and data packet sending and receiving are implemented with the GPRS technique. Computers are configured in the industrial Ethernet to control the pressure filter, the workstation of the operator operates the pressure filter and the workstation of the engineer monitors running of the pressure filter and modification of data. Operating data of the filtration state of the pressure filter may be printed by the printer into files. It needs no person to operate the operation and control system for the pressure filter at the scene. Therefore, the remote operation and control system for the pressure filter is achieved, the operator is safe, the labor cost is reduced, the technological capability of the control system for the pressure filter is improved, and the computer controlled system for the pressure filer reaches an advanced level.

BRIEF DESCRIPTION OF DRAWINGS

The disclosure is further explained with drawings and embodiments.

FIG. 1 is a schematic diagram of a remote operation and control system for a pressure filter according to the disclosure.

In FIG. 1, 1 represents a pressure filter, 2 represents a PLC controller, 3 represents a GPRS-DTU communication network, 4 represents a signal antenna, 5 represents a communication tower, 6 represents a GGSN communication, 7 represents an SGSN communication, 8 represents a router, 9 represents a firewall, 10 represents a switch, 11 represents an industrial Ethernet, 12 represents a computer workstation for an operator, 13 represents a computer workstation for an engineer, 14 represents a printer, 15 represents a UPS power supply and 16 represents a fiber transceiver.

DETAILED DESCRIPTION

FIG. 1 illustrates a remote operation and control system for a pressure filter provided in the disclosure. A PLC controller 2 in the pressure filter 1 is connected to an interface of a GPRS-DTU communication network 3. An antenna 4 of the GPRS-DTU communication network 3 communicates with a communication tower 5. The communication tower 5 is connected to a GPRS communication network formed by a GGSN communication interface 6 and an SGSN communication interface 7. The GPRS communication network is connected to a connection port of a router 8. The router 8 is connected to a firewall 9 and the firewall 9 is connected to a connection port of a switch 10. An industrial Ethernet 11 is connected to a connection port of the switch 10. A computer workstation 12 for an operator is provided in the industrial Ethernet 11 to operate the pressure filter. A computer workstation 13 for an engineer is provided in the industrial Ethernet 11 to monitor running of the pressure filter and modification of data. A printer 14 and a UPS power supply 15 are provided in the industrial Ethernet 11. The switch 10 is connected to a fiber transceiver 16. Therefore, a Local Area Network of a company is formed. A manager may acquire running states of the pressure filter through the Local Area network.

The remote monitoring system for the pressure filter provided in the disclosure is a computer control system in which centralization and decentralization are combined. With the disclosure, technological parameters, electrical parameters and operation states of the working site of the pressure filter are monitored, controlled, chained, alarmed and printed into reports. Data acquisition, data communication, time control and superior monitoring and management, which are necessary for the whole system, are performed by a series of communication chains between a center and a remote station. The whole system includes a monitoring center and a remote PLC control station. The remote PLC control station includes a Programmable Logic Controller (PLC) system, a communication module and a measuring instrument. The operation states of the pressure filter are acquired and controlled in a decentralized manner and are managed by the monitoring center in a centralized manner. Data communication between the monitoring center and respective remote PLC monitoring substations is performed through a network of China Mobile. The data acquired by the respective remote PLC monitoring substations is sent to a data platform of China Mobile through the GPRS communication network, and then sent to the Internet through an internal network of China Mobile, and finally sent to the centralization monitoring center having a static IP address or a static domain name. The operation states of the pressure filter at the scene are reflected in the monitoring center in real time. As an internal data server of the company, the monitoring center provides product information to the manager in first time, and the monitoring center may automatically inform related person of a message when the system is in emergency.

The technological capability of the control system for the pressure filter is improved according to the disclosure. The data sent from the respective remote PLC control stations through the GPRS network of China mobile is transmitted to the Internet and demodulated by an asymmetric digital subscriber line (ADSL) modulator-demodulator (MODEM), then sent to the router and performed with VPN decryption after being detected by the firewall. The decrypted data packet is forwarded to a specified data center server which performs data receiving processing on the data packet. In addition, the data center server is responsible for sending corresponding control instruction data to the respective remote PLC control stations. Respective clients may obtain data from the data center server and perform, with human-machine interface software, monitoring, alarming, historical curve display, etc., of the respective remote PLC control stations. Therefore, it needs no person to operate the operation and control system for the pressure filter at the scene, and filtration of the remote operation and control system for the pressure filter is achieved, thus the operator of the pressure filter is safe, the labor cost is reduced, the technological capability of the control system for the pressure filter is improved, and the computer controlled system for the pressure filer reaches an advanced level in the solid-liquid separation industry.

The remote operation and control system for the pressure filter provided in the disclosure is explained in detail above. Exemplary examples are applied for illustrating the principle and implementations of the disclosure, and the description of the embodiments are merely used for understanding of the method and core concepts of the disclosure. It should be noted that, various amendments and modifications may be made by those skilled in the art without departing from the principle of the disclosure and the amendments and modifications shall fall within the scope of protection of the disclosure.

The invention claimed is:
1. A remote operation and control system, comprising:
a pressure filter for solid-liquid separation and filtering materials containing a caustic chemical gas;
a general packet radio service-data transfer unit (GPRS-DTU) communication network provided in the pressure filter;
a Programmable Logic Controller (PLC) controller provided in the pressure filter and connected to the GPRS-DTU communication network;

a signal antenna provided for the GPRS-DTU communication network, wherein the antenna communicates with a communication tower;

a gateway GPRS support node (GGSN) communication interface and a serving GPRS support node (SGSN) communication interface, which form a GPRS communication network, wherein a signal from the communication tower is transmitted to the GPRS communication network and the GPRS communication network utilizes GPRS Access Point Name (APN);

a router connected to the GPRS communication network, wherein the signal is transmitted from a connection port of the GPRS communication network to the router;

a firewall connected to the router and a switch connected to the firewall, wherein the signal is transmitted to the firewall via the router and then to the switch;

a data center server receiving data contained in the signal from the firewall and sending instructions for controlling the PLC controller;

an industrial Ethernet connected to the switch, wherein a computer in the industrial Ethernet is connected to the switch and a PLC control system, and the computer receives the data from the data center server and provides a human-machine interface for monitoring the PLC controller; and a fiber transceiver connected to the switch and the PLC control system.

2. The remote operation and control system for the pressure filter according to claim 1, wherein the computer in the industrial Ethernet comprises a workstation for an operator of the pressure filter.

3. The remote operation and control system for the pressure filter according to claim 1, wherein the computer in the industrial Ethernet comprises a workstation for an engineer of the pressure filter.

4. The remote operation and control system for the pressure filter according to claim 1, wherein the industrial Ethernet comprises an uninterruptible power system (UPS) power supply.

5. The remote operation and control system for the pressure filter according to claim 1, wherein the industrial Ethernet comprises a printer.

6. The remote operation and control system for the pressure filter according to claim 1, wherein the fiber transceiver is connected to the switch to form a Local Area Network for a company.

* * * * *

UNITED STATES PATENT AND TRADEMARK OFFICE
CERTIFICATE OF CORRECTION

PATENT NO. : 9,548,791 B2  
APPLICATION NO. : 14/352939  
DATED : January 17, 2017  
INVENTOR(S) : Guiting Jiang and Fengqi Yan Page 1 of 1

It is certified that error appears in the above-identified patent and that said Letters Patent is hereby corrected as shown below:

On the Title Page

Item (71) Applicant should read: Jingjin Environmental Protection Inc., Shandong (CN)

Signed and Sealed this  
First Day of May, 2018

Andrei Iancu  
*Director of the United States Patent and Trademark Office*